United States Patent
Mishima et al.

(10) Patent No.: US 7,499,802 B2
(45) Date of Patent: Mar. 3, 2009

(54) SYSTEM AND METHOD FOR CONTROLLING LOAD ON VEHICLE

(75) Inventors: Masahiro Mishima, Kanagawa (JP); Akihiro Deguchi, Mie (JP)

(73) Assignees: NEC Mobiling, Ltd., Kanagawa (JP); Sumitomo Wiring Systems, Ltd., Mie (JP)

( * ) Notice: Subject to any disclaimer, the term of this patent is extended or adjusted under 35 U.S.C. 154(b) by 589 days.

(21) Appl. No.: 10/546,024

(22) PCT Filed: Mar. 22, 2004

(86) PCT No.: PCT/JP2004/003856

§ 371 (c)(1),
(2), (4) Date: Aug. 18, 2005

(87) PCT Pub. No.: WO2004/083086

PCT Pub. Date: Sep. 30, 2004

(65) Prior Publication Data

US 2006/0161345 A1    Jul. 20, 2006

(30) Foreign Application Priority Data

Mar. 20, 2003    (JP)    ............... 2003-077629

(51) Int. Cl.
*B65G 61/00* (2006.01)
*G06F 17/00* (2006.01)
(52) U.S. Cl. ................. 701/213; 701/2; 701/124; 340/539.13; 705/6
(58) Field of Classification Search ............. 701/213, 701/1, 124, 2; 340/991, 993, 539.13, 539.26, 340/539.1; 705/6, 13
See application file for complete search history.

(56) References Cited

U.S. PATENT DOCUMENTS 5,424,720 A * 6/1995 Kirkpatrick ............. 340/585

(Continued)

FOREIGN PATENT DOCUMENTS

JP    5-62033 A    3/1993

(Continued)

*Primary Examiner*—Tan Q Nguyen
(74) *Attorney, Agent, or Firm*—Sughrue Mion, PLLC

(57) ABSTRACT

A vehicle load control system, in which information on the cargo loading condition of a moving vehicle is obtained through communication between the moving vehicle and a control center via a communication network to provide centralized control of efficient cargo loading operation. A vehicle load control system provides centralized control of efficient cargo loading operation through communication between a moving vehicle (100) and a control center (120) via a communication network (110). The moving vehicle (100) includes a radio section (101) for receiving a load data acquisition request signal and transmitting measured load data determined by at least one distance sensor (105) in the luggage compartment and location data of the vehicle. The control center (120) includes a storage (124) for storing the measured load data and the location data of the moving vehicle (100) received from the vehicle, a communication control terminal (125) for transmitting the load data acquisition request signal to the radio section (101) and storing the measured load data received from the vehicle (100) in the storage (124), and a control terminal (122) for analyzing the measured load data stored in the storage (124) and determining the loading condition of the vehicle (100) based on the analyzed data.

16 Claims, 4 Drawing Sheets

U.S. PATENT DOCUMENTS

| | | | |
|---|---|---|---|
| 6,437,702 B1 * | 8/2002 | Ragland et al. | 340/686.1 |
| 6,665,582 B1 * | 12/2003 | Moritz et al. | 700/213 |
| 6,687,609 B2 * | 2/2004 | Hsiao et al. | 701/207 |
| 6,927,688 B2 * | 8/2005 | Tice | 340/539.26 |
| 7,034,683 B2 * | 4/2006 | Ghazarian | 340/568.1 |

FOREIGN PATENT DOCUMENTS

| | | |
|---|---|---|
| JP | 8-44917 A | 2/1996 |
| JP | 8-55166 A | 2/1996 |
| JP | 11-211438 A | 8/1999 |
| JP | 11-334806 A | 12/1999 |
| JP | 2001-334864 A | 12/2001 |
| JP | 2002-32445 A | 1/2002 |
| JP | 2002-120912 A | 4/2002 |
| JP | 2002-149769 A | 5/2002 |
| JP | 2002-288316 A | 10/2002 |
| JP | 2002-347936 A | 12/2002 |
| JP | 2003-191787 A | 7/2003 |

* cited by examiner

SYSTEM AND METHOD FOR CONTROLLING LOAD ON VEHICLE

TECHNICAL FIELD

The present invention relates to a vehicle load control system and a vehicle load control method for providing centralized control of efficient cargo loading operation based on information about the cargo loading condition of a moving vehicle obtained through communication between the vehicle and a control center via a communication network.

BACKGROUND ART

Efficient loading of cargo on a transportation or delivery vehicle is one of the most effective measures to improve the delivery efficiency of the vehicle. For loading cargo into the vehicle as effectively as possible, it is necessary to learn the cargo loading performance of the vehicle as well as an unused or waste space in the luggage compartment. To acquire the loading performance, there has been well known a method in which a loading operator or a driver who loads cargo onto the vehicle makes a record of loading conditions of the vehicle.

PROBLEMS THAT THE INVENTION IS TO SOLVE

However, with the method in which the driver keeps a record of loading conditions as above, data are collected manually, through a human operator. This leads to human error such as omissions of records and falsification of data. That is, to construct an efficient cargo loading method, it is required to analyze the data in consideration of the human error.

It is therefore an object of the present invention to provide a vehicle load control system and a vehicle load control method aimed at meeting the need for collecting data of the loading performance of a vehicle automatically.

DISCLOSURE OF THE INVENTION

In accordance with one aspect of the present invention, to achieve the object mentioned above, there is provided a vehicle load control system in which information on the cargo loading condition of a moving vehicle is obtained through communication between the vehicle and a control center via a communication network to provide centralized control of efficient cargo loading operation. The moving vehicle includes a radio section for receiving a load data acquisition request signal and transmitting via the communication network measured load data determined based on the volume or capacity of the luggage compartment of the vehicle using at least one distance sensor placed in the luggage compartment and location data indicating the location of the vehicle. The control center includes a storage for storing the measured load data and the location data of the moving vehicle received from the vehicle, a communication control terminal for performing control to transmit the load data acquisition request signal to the radio section and store the measured load data received from the vehicle in the storage, and a control terminal for analyzing the measured load data stored in the storage and determining the loading condition of the vehicle based on the analyzed data.

The moving vehicle may further include a measurement device for instructing the distance sensor to make a measurement, a global positioning system (GPS) for obtaining the location data of the vehicle, and a controller for controlling the overall operation of the measurement device, the GPS, and the radio section.

Preferably, the distance sensor is an ultrasonic sensor, and the measurement device controls the ultrasonic sensor to emit an ultrasonic wave toward cargo loaded in the moving vehicle. The controller controls the measurement device to count the time from when the ultrasonic wave is emitted to when the ultrasonic wave reflected from the cargo is received, obtains the time data as measured load data, and transmits the measured load data and the location data of the moving vehicle to the control center.

The measurement device may calculate an average measured value, the maximum measured value, and the minimum measured value during a predetermined measurement period of time.

Preferably, the control center receives the measured load data and the location data from the controller, obtains from the location data event information indicating departure for or arrival at the delivery location of the moving vehicle, and transmits the load data acquisition request signal to the controller.

Preferably, based on the measured load data stored in the storage, the control terminal calculates, as the loading rate, the rate of the volume of cargo to the volume of the entire space of the luggage compartment from the position of the ultrasonic sensor to the floor of the luggage compartment to detect empty or free space in the luggage compartment.

In addition, when palletized cargo is transported, the control terminal may analyze the palletized cargo based on the predetermined height of a loading platform.

Further, the control terminal may analyze the measured load data by rearranging the measured load data according to delivery services or a delivery route, a vehicle, and a date.

In accordance with another aspect of the present invention, there is provided a vehicle load control method in which information on the cargo loading condition of a moving vehicle is obtained through communication between the vehicle and a control center via a communication network to provide centralized control of efficient cargo loading operation. The vehicle load control method comprises a first step of transmitting a load data acquisition request signal to the moving vehicle, a second step of receiving the load data acquisition request signal from the control center, a third step of determining measured load data with respect to the volume or capacity of the luggage compartment of the vehicle using at least one distance sensor, a fourth step of transmitting the measured load data and location data indicating the location of the vehicle via the communication network to the control center, a fifth step of receiving and storing in a storage the measured load data and the location data, and a sixth step of analyzing the measured load data stored in the storage and determining the loading condition of the vehicle based on the analyzed data.

Preferably, in the third step, an ultrasonic sensor is used as the distance sensor. The third step may include the steps of emitting an ultrasonic wave toward cargo loaded in the moving vehicle, and counting the time from when the ultrasonic wave is emitted to when the ultrasonic wave reflected from the cargo is received. The fourth step may include the step of transmitting the time data as measured load data to the control center.

The third step may further include the step of calculating an average measured value, the maximum measured value, and the minimum measured value during a predetermined measurement period of time.

The fifth step may include the steps of obtaining event information indicating departure for or arrival at the delivery location of the moving vehicle based on the location data, and storing the event information in the storage.

The sixth step may include the step of calculating as the loading rate, based on the measured load data stored in the storage, the rate of the volume of cargo to the volume of the entire space of the luggage compartment from the position of the ultrasonic sensor to the floor of the luggage compartment to detect empty or free space in the luggage compartment.

Further, the sixth step may include the step of analyzing, when palletized cargo is transported, the palletized cargo based on the predetermined height of a loading platform.

Still further, the sixth step may include the step of analyzing the measured load data by rearranging the measured load data according to delivery services or a delivery route, a vehicle, and a date.

Figure 1:
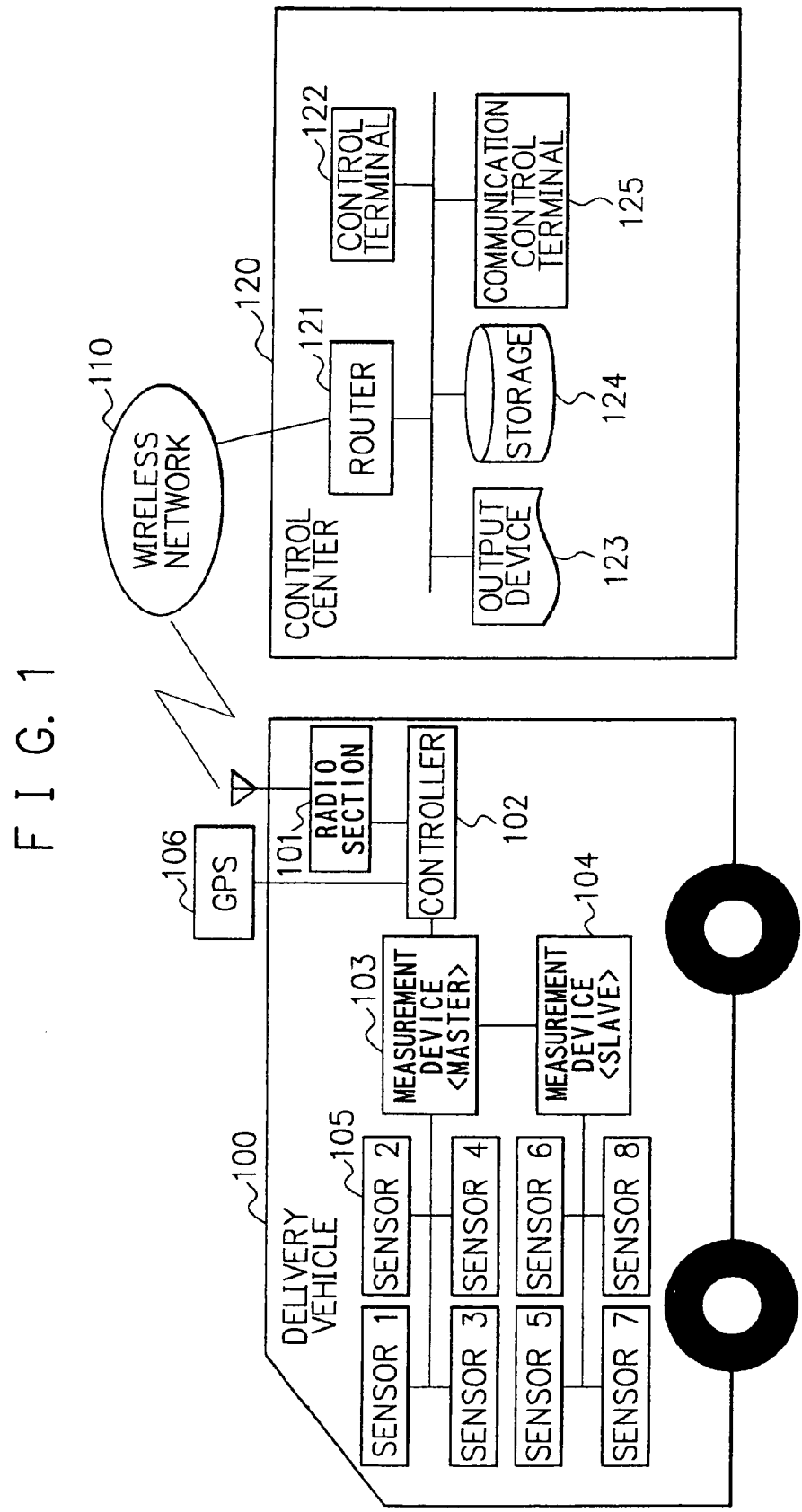
FIG. 1 is a diagram showing the configuration of a vehicle load control system in accordance with the present invention.

Incidentally, the reference numeral 100 represents a delivery vehicle. The reference numeral 101 represents a radio section. The reference numeral 102 represents a controller. The reference numeral 103 represents a measurement device (master). The reference numeral 104 represents a measurement device (slave). The reference numeral 105 represents sensors. The reference numeral 106 represents a global positioning system (GPS). The reference numeral 110 represents a wireless network. The reference numeral 120 represents a control center. The reference numeral 121 represents a router. The reference numeral 122 represents a control terminal. The reference numeral 123 represents an output device. The reference numeral 124 represents a storage. The reference numeral 125 represents a communication control terminal. The reference numeral 202 represents cargo. The reference numerals 301 to 306 represent cargo. The reference numeral 310 represents empty space.

BEST MODE FOR CARRYING OUT THE INVENTION

Referring now to the drawings, a description of a preferred embodiment of the present invention will be given in detail.

FIG. 1 is a diagram showing the configuration of a vehicle load control system according to an embodiment of the present invention. As can be seen in FIG. 1, the vehicle load control system comprises a delivery vehicle 100 the loading rate of which is to be measured, a wireless network 110 through which load data measured in the vehicle 100 is sent to a control center 120, and the control center 120 for controlling and storing the load data sent from the vehicle 100 via the network 110.

The delivery vehicle 100 includes sensors 105 for measuring the amount of load or cargo, measurement devices 103 and 104 for controlling the sensors 105, a global positioning system (GPS) 106 for obtaining information on the location of the vehicle 100, a radio section 101 for communicating via the wireless network 110 with the control center 120, and a controller 102 for controlling the measurement devices 103 and 104, the GPS 106, and the radio section 101.

Figure 2:
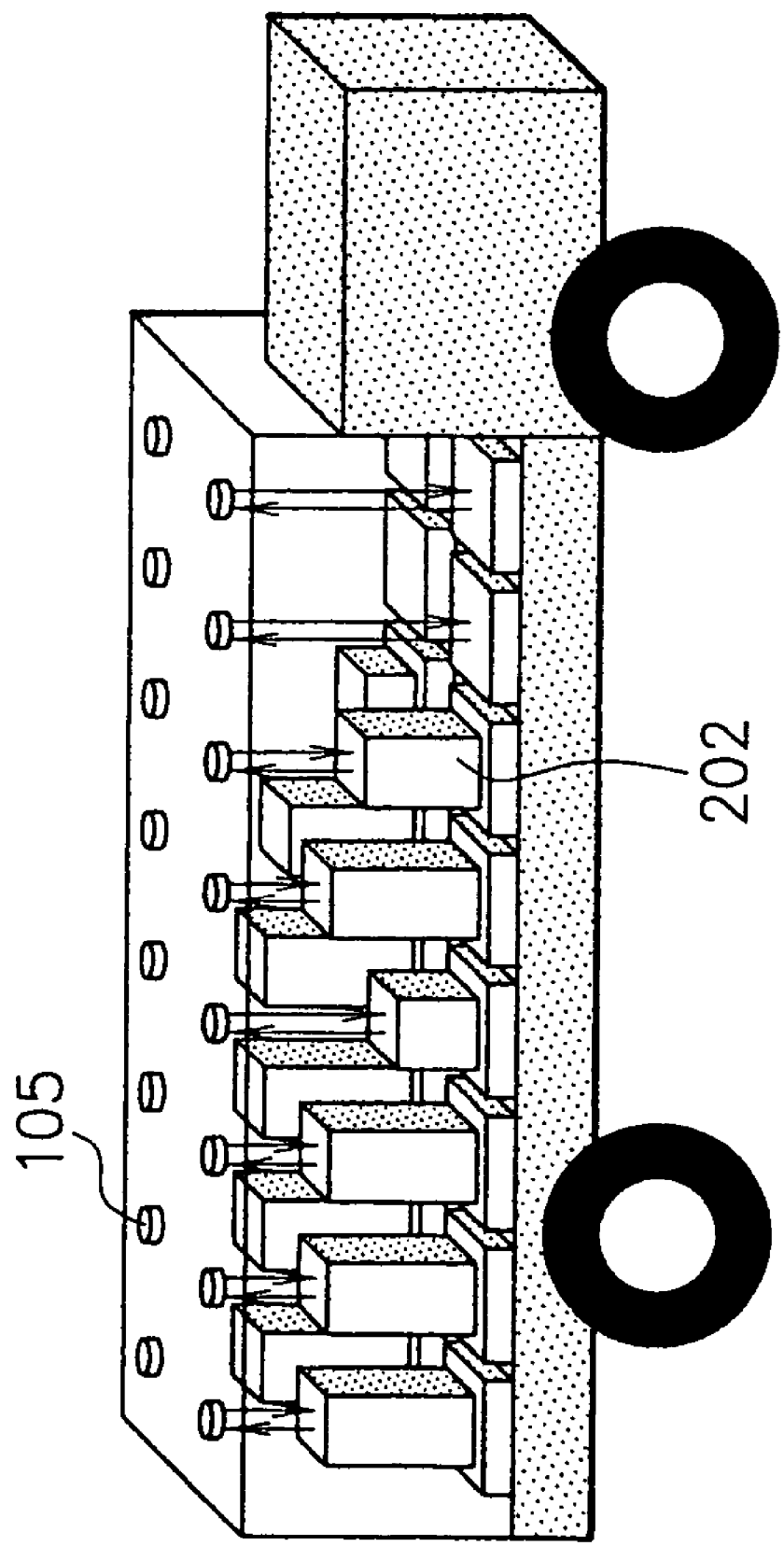
FIG. 2 is a diagram for explaining a method of measuring a space of a luggage compartment by an ultrasonic wave from an ultrasonic wave sensor reflected from cargo.

The measurement devices 103 and 104 have a master-slave relationship, and one or more sets of them are required depending on the number of sensors. Each of the sensors 105 is an ultrasonic wave sensor and, as shown in FIG. 2, attached to the ceiling of the luggage compartment of the delivery vehicle 100. The sensor 105 on the ceiling is oriented to transmit ultrasonic waves toward cargo 202. The control center 120 includes a router 121 for routing data from the wireless network 110, a communication control terminal 125 for communicating data with the delivery vehicle 100, a storage 124 for storing data obtained through the communication, a control terminal 122 for classifying and analyzing the data stored in the storage 124, and an output device 123 for outputting the data analyzed by the terminal 122. The respective components of the control center 120 are connected to a network such as a local area network (LAN) or a wide area network (WAN).

In the following, with reference to FIGS. 1 to 4, a description will be given of the operation of the vehicle load control system according to an embodiment of the present invention. When the communication control terminal 125 detects an event, for example, that the delivery vehicle 100 has departed for or arrived at a delivery location based on the location information of the vehicle 100, the terminal 125 sends a load data acquisition request in the form of a data message to the controller 102 (step S101). The communication control terminal 125 of the control center 120 can determine the present location of the delivery vehicle 100 based on the location information obtained by the GPS 106 received from the controller 102 of the vehicle 100 via the wireless network 110.

When the delivery vehicle 100 receives the load data acquisition request message, the measurement devices 103 and 104 measure the amount of the cargo 202 by using the sensors 105 (step S102). More specifically, each ultrasonic sensor 105 emits an ultrasonic wave to the cargo 202. The measurement devices 103 and 104 count the time from when the ultrasonic wave is emitted to when the ultrasonic wave reflected from the cargo 202 is received to determine the amount of the load.

In addition, when the load data acquisition request message is received, the controller 102 instructs the measurement devices 103 and 104 to calculate necessary values such as an average measured value, the maximum measured value, and the minimum measured value based on data obtained by the sensors 105 during a predetermined measurement period of time. The controller 102 then receives the values from the measurement devices 103 and 104, and sends the measured load data in the form of a data message to the communication control terminal 125 via the radio section 101 (step S103). Having received the load data message, the communication control terminal 125 stores the load data in the storage 124 (step S104). The process is repeated continuously between the controller 102 and the communication control terminal 125.

Figure 3:
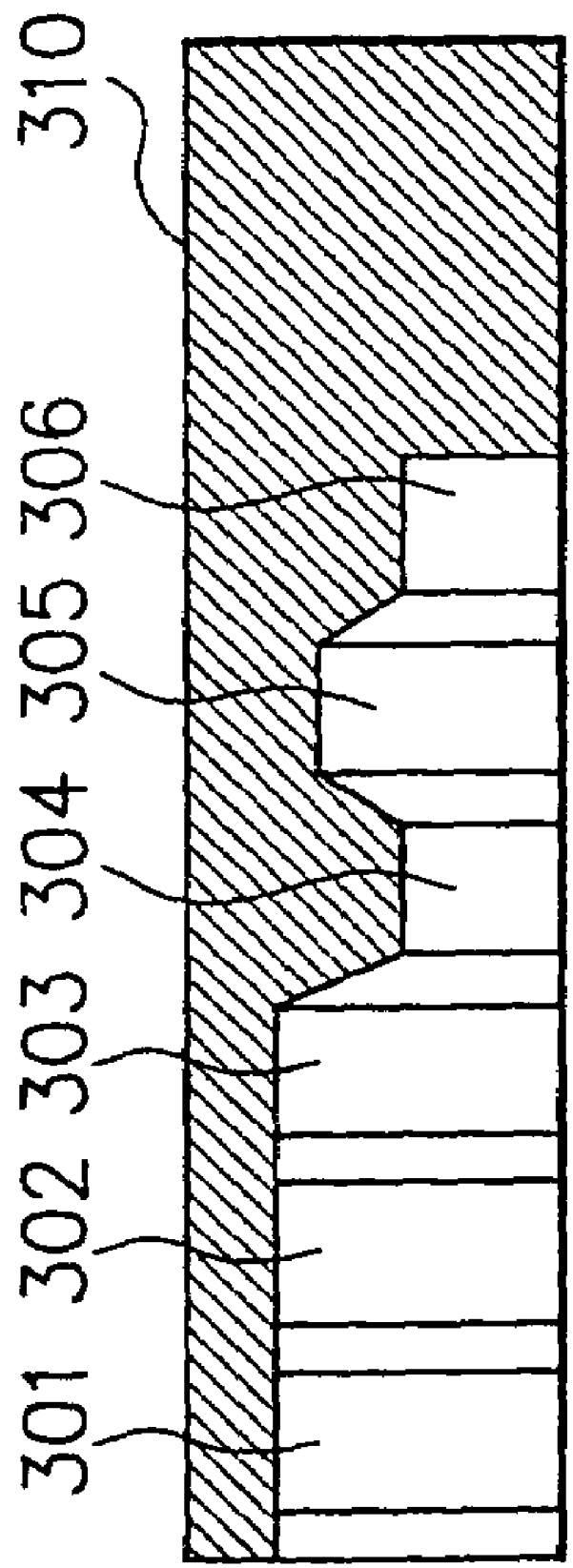
FIG. 3 is a diagram showing the rate of the volume of cargo to the volume of the entire space of the luggage compartment from the position of each ultrasonic sensor to the floor of the luggage compartment.
Figure 4:
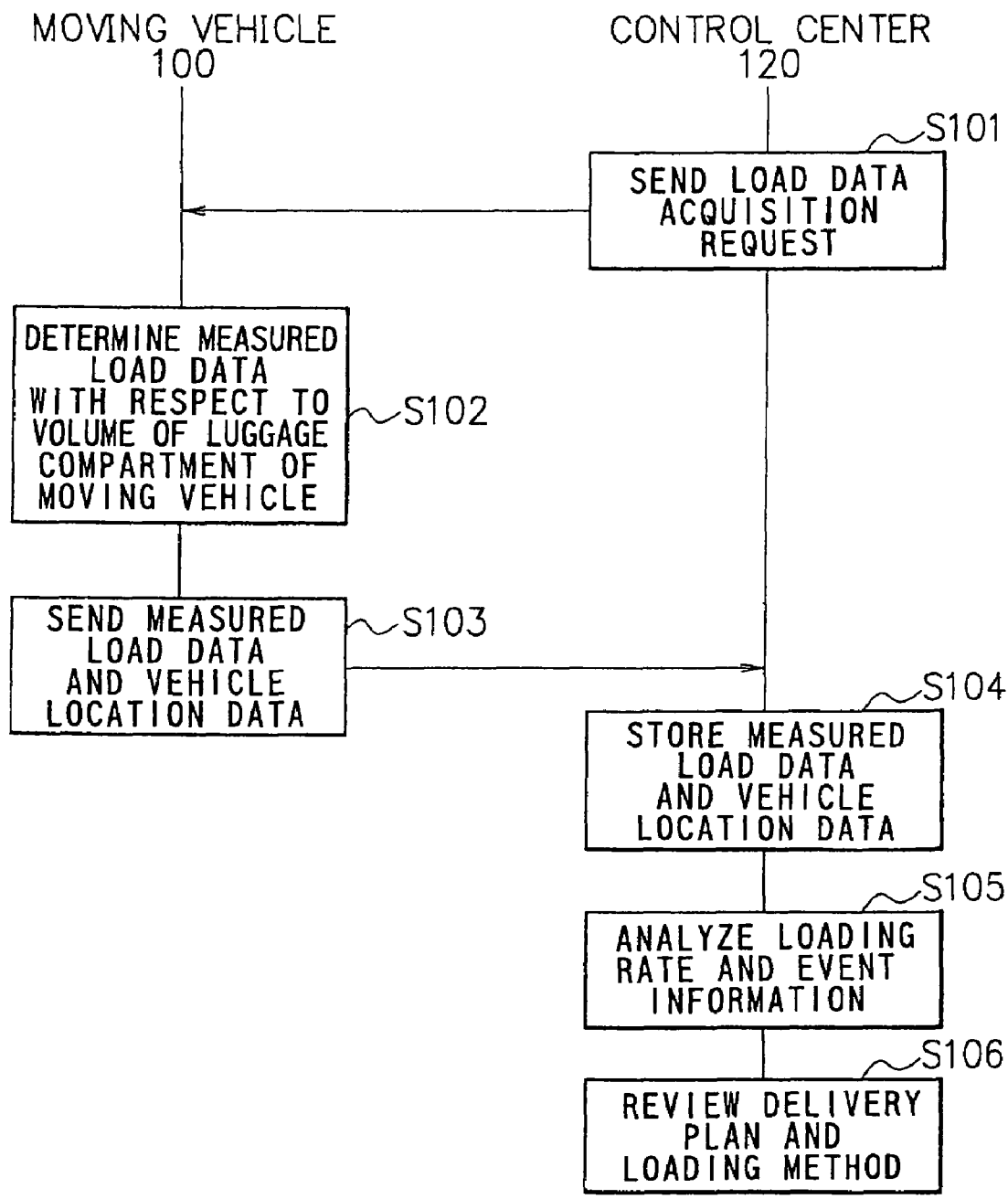
FIG. 4 is a flowchart showing an example of the operation of the vehicle load control system in accordance with the present invention.

Meanwhile, as can be seen in FIG. 3, based on the load data stored in the storage 124, the control terminal 122 calculates, as the loading rate, the rate of the volume of cargoes 301 to 306 to the volume of the entire space of the luggage compartment from the position of each sensor 105 to the floor of the luggage compartment. Thereby, the control terminal 122 detects an empty space 310 in the luggage compartment. The control terminal 122 analyzes the loading rate at each delivery point on the delivery route of the delivery vehicle 100 based on the location information (step S105). Thus, the delivery plan and the loading method can be reviewed and revised according to the analysis (step S106).

Additionally, when cargo is transported in pallets, the palletized cargo can be analyzed by defining the height of a loading platform. More specifically, when the height of the loading platform is X centimeters (cm) and a value obtained by the sensor is X cm, it is determined that no pallet is loaded on the platform. Consequently, the number of pallets to be loaded on the delivery vehicle 100 at a delivery point can be reviewed and adjusted.

In another embodiment of the present invention, the ultrasonic sensors may be replaced with sensors using laser beams or infrared rays.

INDUSTRIAL APPLICABILITY

By obtaining the loading rate with respect to each vehicle, each delivery service or delivery route, and each day, it is possible to review and revise the loading method, etc. to thereby improve the loading efficiency of the delivery vehicle. Concretely, the following two methods are available.

First, a high-loading rate reference value is determined (for example, 90% or more) such that if the loading rate of a delivery vehicle is less than the reference value, the vehicle is not allowed to start. Thereby, the number of delivery services or vehicles can be reduced.

Second, based on the obtained numeric data, the right combination of cargoes and a loading method thereof are standardized for optimal cargo loading operation. The standardized information is provided in a detailed manual to loading operators or drivers to improve their skills.

The invention claimed is:

1. A vehicle load control system in which information on the cargo loading condition of a moving vehicle is obtained through communication between the moving vehicle and a control center via a communication network to provide centralized control of efficient cargo loading operation, wherein:
the moving vehicle includes a radio section for receiving a load data acquisition request signal and transmitting via the communication network measured load data determined based on the volume of the luggage compartment of the moving vehicle using at least one distance sensor placed in the luggage compartment and location data indicating the location of the moving vehicle; and
the control center includes:
a storage for storing the measured load data and the location data of the moving vehicle received from the moving vehicle;
a communication control terminal for performing control to transmit the load data acquisition request signal to the radio section and store the measured load data received from the moving vehicle in the storage; and
a control terminal for analyzing the measured load data stored in the storage and determining the loading condition of the moving vehicle based on the analyzed data.

2. A vehicle load control system according to claim 1, wherein the moving vehicle includes:
a measurement device for instructing the distance sensor to make a measurement;
a global positioning system (GPS) for obtaining the location data of the moving vehicle; and
a controller for controlling the overall operation of the measurement device, the GPS, and the radio section.

3. A vehicle load control system according to claim 2, wherein:
the distance sensor is an ultrasonic sensor;
the measurement device controls the ultrasonic sensor to emit an ultrasonic wave toward cargo loaded in the moving vehicle;
the controller controls the measurement device to count the time from when the ultrasonic wave is emitted to when the ultrasonic wave reflected from the cargo is received, obtains the time data as measured load data, and transmits the measured load data and the location data of the moving vehicle to the control center.

4. A vehicle load control system according to claim 3, wherein the measurement device calculates an average measured value, the maximum measured value, and the minimum measured value during a predetermined measurement period of time.

5. A vehicle load control system according to claim 3, wherein the control center receives the measured load data and the location data from the controller, obtains from the location data event information indicating departure for or arrival at the delivery location of the moving vehicle, and transmits the load data acquisition request signal to the controller.

6. A vehicle load control system according to claim 4 or 5, wherein, based on the measured load data stored in the storage, the control terminal calculates, as the loading rate, the rate of the volume of cargo to the volume of the entire space of the luggage compartment from the position of the ultrasonic sensor to the floor of the luggage compartment to detect empty space in the luggage compartment.

7. A vehicle load control system according to claim 6, wherein when palletized cargo is transported, the control terminal analyzes the palletized cargo based on the predetermined height of a loading platform.

8. A vehicle load control system according to claim 6, wherein the control terminal analyzes the measured load data by rearranging the measured load data according to delivery services, a vehicle, and a date.

9. A vehicle load control system according to claim 1 or 2, wherein the distance sensor is a sensor using laser beams or infrared rays.

10. A vehicle load control method in which information on the cargo loading condition of a moving vehicle is obtained through communication between the moving vehicle and a control center via a communication network to provide centralized control of cargo loading operation, the method comprising:
a first step of transmitting a load data acquisition request signal to the moving vehicle;
a second step of receiving the load data acquisition request signal from the control center;
a third step of determining measured load data with respect to the volume of the luggage compartment of the moving vehicle using at least one distance sensor;
a fourth step of transmitting the measured load data and location data indicating the location of the moving vehicle via the communication network to the control center;
a fifth step of receiving and storing in a storage the measured load data and the location data; and
a sixth step of analyzing the measured load data stored in the storage and determining the loading condition of the moving vehicle based on the analyzed data.

11. A vehicle load control method according to claim 10, wherein:

in the third step, an ultrasonic sensor is used as the distance sensor;

the third step includes the steps of:

emitting an ultrasonic wave toward cargo loaded in the moving vehicle; and counting the time from when the ultrasonic wave is emitted to when the ultrasonic wave reflected from the cargo is received; and the fourth step includes the step of transmitting the time data as measured load data to the control center.

12. A vehicle load control method according to claim 11, wherein the third step further includes the step of calculating an average measured value, the maximum measured value, and the minimum measured value during a predetermined measurement period of time.

13. A vehicle load control method according to claim 10, wherein the fifth step further includes the steps of:

obtaining event information indicating departure for or arrival at the delivery location of the moving vehicle based on the location data; and storing the event information in the storage.

14. A vehicle load control method according to claim 13, wherein the sixth step further includes the step of calculating as the loading rate, based on the measured load data stored in the storage, the rate of the volume of cargo to the volume of the entire space of the luggage compartment from the position of the ultrasonic sensor to the floor of the luggage compartment to detect empty space in the luggage compartment.

15. A vehicle load control method according to claim 13, wherein the sixth step further includes the step of analyzing, when palletized cargo is transported, the palletized cargo based on the predetermined height of a loading platform.

16. A vehicle load control method according to claim 10, wherein the sixth step further includes the step of analyzing the measured load data by rearranging the measured load data according to delivery services, a vehicle, and a date.

* * * * *